A. BOURGEOIS.
RESILIENT WHEEL.
APPLICATION FILED DEC. 22, 1914.

1,168,474.

Patented Jan. 18, 1916.

Witnesses

Albert Bourgeois, Inventor,
by C. A. Snow & Co.
Attorneys.

UNITED STATES PATENT OFFICE.

ALBERT BOURGEOIS, OF LAFOURCHE CROSSING, LOUISIANA.

RESILIENT WHEEL.

1,168,474.

Specification of Letters Patent.  Patented Jan. 18, 1916.

Application filed December 22, 1914. Serial No. 878,537.

*To all whom it may concern:*

Be it known that I, ALBERT BOURGEOIS, a citizen of the United States, residing at Lafourche Crossing, in the parish of Lafourche and State of Louisiana, have invented a new and useful Resilient Wheel, of which the following is a specification.

The present invention appertains to resilient wheels, and is particularly an improvement over the resilient wheel disclosed in my Patent No. 1,120,896, issued December 15, 1914.

The primary object of the invention, like kindred wheels of the same character, is to provide a vehicle wheel eliminating the use of a pneumatic tire, and provided with means whereby the resiliency and other desirable qualities of a wheel having a pneumatic tire may be had, but at the same time, will eliminate the objectionable characteristics of a pneumatic tire.

This invention aims to provide a resilient wheel of unique construction, whereby the wheel will permit of vertical relief when it encounters obstructions, and to absorb the shocks, and whereby the wheel will be comparatively simple, light, strong, durable and inexpensive in construction, and will be practical, efficient and practically noiseless in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in its preferred embodiment in the accompanying drawings, wherein:—

Figure 1:
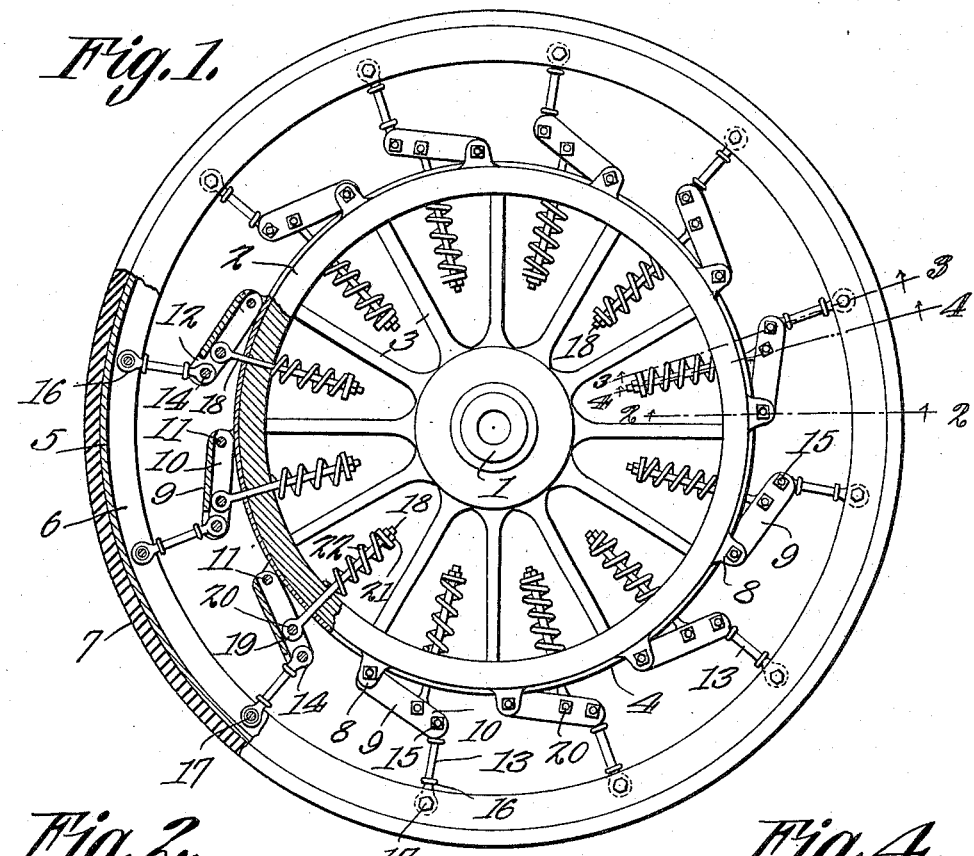
Figure 2:
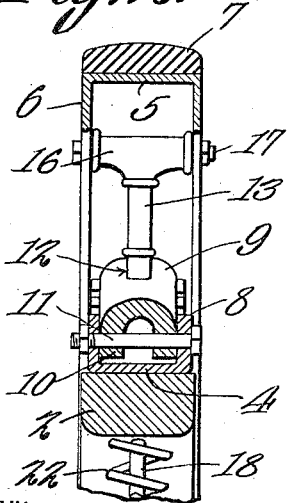
Figures 3, 4:
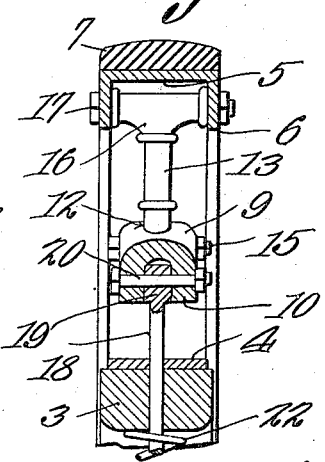

Figure 1 is a side elevation of the improved resilient wheel, portions being broken away. Figs. 2, 3, and 4 are enlarged cross sectional details taken on the lines 2—2, 3—3 and 4—4, respectively, of Fig. 1.

The present wheel embodies a suitable hub 1, and an inner felly or annulus 2, which are connected by spokes 3. A band 4 is secured upon the felly or annulus 2, and an outer rim 5 surrounds the felly or annulus 2 and is spaced suitably therefrom. The rim 5 is preferably in the form of an annular channel having its flanges 6 disposed at the sides of the wheel and projecting inwardly. If desired, a rubber or other tire 7 may be secured upon the rim 5. The foregoing parts may be of various constructions, according to the various circumstances.

The band 4 is equipped with an annular series of pairs of laterally spaced outwardly projecting ears 8, which are disposed adjacent the outer ends of the spokes 3, and a lever 9 has one end pivoted or fulcrumed between the ears 8 of each pair. The lever 9 is in the form of a plate doubled or bent upon a longitudinal line to render the lever of U-shaped cross section with the bend facing outwardly, and the flanges 10 projecting inwardly. The ends of the flanges 10 are pivoted within the bearing ears 8, by means of a bolt or other pivot element 11 engaged through the ears 8 and through the flanges 10 of the lever 9. The lever 9 being formed from the plate in the manner indicated, will be substantial in construction, and will accommodate the parts attached thereto in a most desirable and efficient manner.

The levers 9 project in the same general direction away from the ears 8, about the felly or annulus 2, and the bends of the plates constituting the levers 9 are provided at the free ends of the levers with open slots 12, to enable the links 13 to be pivoted to the free ends of the levers. The links 13 connect the free ends of the levers and the rim 5, the inner ends of the links 13 being provided with eyes or bearings 14 projecting through the slots 12 of the levers 9, and journaled or pivoted between the flanges 10 of the levers at the free ends of the levers, by means of bolts or other pivot elements 15 engaged through the said flanges and eye or bearing. The outer ends of the links 13 are provided with bearings 16 embracing or journaled upon bolts or other pivot elements 17 engaged through the flanges 6 of the rim 5 and extending across the interior of the rim.

Radial rods or plungers 18 are slidable loosely through the felly 2 and band 4 between the spokes 3, and are provided at their outer ends with eyes or bearings 19 fulcrumed or pivoted to the respective levers 9, between the flanges and ends thereof, by means of bolts or pivot elements 20 engaged through the flanges of the lever and the eyes or bearings 19. Nuts or other members 21 are threaded or otherwise secured upon the inner ends of the rods or plungers 18, and coiled wire expansion springs 22 are disposed upon the rods 18 between the nuts 21 and the felly 2, to exert an inward tension upon the rods.

The links 13 and levers 9 which connect the rim 5 and felly 2, permit of a relative oscillatory or vibratory movement of the rim and felly, so that the wheel will possess sufficient flexibility for the purposes intended, and it is to be noted that when the felly and rim move relative to one another, certain of the levers 9 will be swung inward or toward the center of the wheel, while others will be swung outward to bring the corresponding springs 22 under greater tension, for resisting the displacement of the parts, and for providing the shock absorbing and cushioning effect.

From the foregoing, taken in connection with the drawing, it is believed that the many advantages of the present structure will be obvious to those versed in the art, without itemizing the advantages in detail.

Slight changes may be made in the various details, within the scope of the appended claim, in reducing the invention to practice.

What is claimed is:—

In a resilient wheel, an inner annulus having outwardly projecting ears, levers each comprising a doubled plate having its bend facing outwardly and its flanges projecting inwardly, pivot elements engaged through said ears and flanges adjacent certain ends of the levers, an outer rim having inwardly projecting flanges, links having their ends fitted between the flanges of the rim and levers, pivot elements engaged with the rim flanges and the respective ends of the links, pivot elements engaged with the flanges of the levers adjacent the free ends of the levers and engaged with the respective ends of the links, the bends of the plates constituting the levers having slots at the free ends of the levers for the reception of the links, rods slidable through the annulus and having their outer ends disposed between the flanges of the levers between the ends thereof, pivot elements engaged with the flanges of the levers and through the respective ends of the rods, nuts upon the inner ends of the rods, and coiled expansion springs disposed upon the rods between the nuts and annulus.

In testimony that I claim the foregoing as my own, I have hereto affixed my signature in the presence of two witnesses.

ALBERT BOURGEOIS.

Witnesses:
ERNEST J. ROBICHAUX,
SIMON KALM.